US012266495B2

(12) United States Patent
Mittelstadt

(10) Patent No.: US 12,266,495 B2
(45) Date of Patent: Apr. 1, 2025

(54) CIRCUIT BREAKER HANDLE INDICATION USING OPTO-MECHANICAL DESIGN

(71) Applicant: Schneider Electric USA, Inc., Andover, MA (US)

(72) Inventor: Chad R. Mittelstadt, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/143,936

(22) Filed: May 5, 2023

(65) Prior Publication Data

US 2023/0274902 A1 Aug. 31, 2023

Related U.S. Application Data

(62) Division of application No. 17/130,179, filed on Dec. 22, 2020, now Pat. No. 11,676,788.

(51) Int. Cl.
*H01H 71/04* (2006.01)
*H01H 71/52* (2006.01)

(52) U.S. Cl.
CPC ............ *H01H 71/04* (2013.01); *H01H 71/52* (2013.01); *H01H 2071/042* (2013.01); *H01H 2071/048* (2013.01)

(58) Field of Classification Search
CPC .. H01H 71/04; H01H 71/52; H01H 2071/048; H01H 2071/042
See application file for complete search history.

(56) References Cited

U.S. PATENT DOCUMENTS 5,243,293 A * 9/1993 Isozaki ................ G01R 15/246 324/96
5,493,278 A 2/1996 Mackenzie et al.
(Continued)

FOREIGN PATENT DOCUMENTS

CA 3034438 A1 8/2019
CN 203850227 U 9/2014
(Continued)

OTHER PUBLICATIONS

Extended European Search Report and Search Opinion dated May 6, 2022 for corresponding European Patent Application No. EP21211882.2-1201, 9 pages.

*Primary Examiner* — John A Tweel, Jr.
(74) *Attorney, Agent, or Firm* — Troutman Pepper Locke LLP

(57) ABSTRACT

A circuit breaker can include a light source, an optical sensor, a handle and a processor. The handle can be movable between different handle positions which correspond to different circuit breaker statuses. The handle can include a handle body and a light control plate which moves along with the handle body. The light control plate can have different light passage regions each of which is configured to be positioned between the light source and the optical sensor when the handle is moved to a corresponding one of the different handle positions. Each of the different light passage regions allows a different amount of light emitted from the light source to pass to the sensor when positioned between the light source and the sensor. The processor is configured to determine a status of the circuit breaker based on the sensed amount of light which relates to a position of the handle.

18 Claims, 10 Drawing Sheets

(56) References Cited

U.S. PATENT DOCUMENTS

| | | | | | |
|---|---|---|---|---|---|
| 9,928,977 | B2 * | 3/2018 | Gibson | .................. | H01H 21/22 |
| 10,283,299 | B2 * | 5/2019 | Mittelstadt | ............. | H01H 71/24 |
| 11,373,831 | B2 * | 6/2022 | Telefus | ................. | H02M 1/083 |
| 11,676,788 | B2 * | 6/2023 | Mittelstadt | ............. | H01H 71/52 |
| | | | | | 335/17 |
| 2023/0090370 | A1 * | 3/2023 | Edwards | ................ | H01H 71/04 |
| | | | | | 361/42 |

FOREIGN PATENT DOCUMENTS

| | | | |
|---|---|---|---|
| CN | 107193321 | A | 9/2017 |
| DE | 9406897 | U1 | 6/1994 |
| FR | 2986066 | A1 | 7/2013 |
| JP | H0475225 | A | 3/1992 |
| KR | 20200129226 | A | 11/2020 |
| WO | 2015147826 | A1 | 10/2015 |

* cited by examiner

CIRCUIT BREAKER HANDLE INDICATION USING OPTO-MECHANICAL DESIGN

PRIORITY INFORMATION

The present application is a divisional application and claims the benefit of and priority to U.S. Ser. No. 17/130,179 filed on Dec. 22, 2020, and is hereby incorporated by reference in its entirety.

TECHNICAL FIELD

The present disclosure relates to a status indicator for a circuit breaker.

BACKGROUND

A circuit breaker is an overcurrent protective device that is used for circuit protection and isolation. The circuit breaker provides electrical system protection when a designated electrical abnormality such as an overcurrent or overload event occurs in the system. One type of circuit breaker is a miniature circuit breaker (MCB), which is typically used for low voltage applications. An MCB typically includes a base and cover, and an electrical circuit between a line terminal and a load terminal. The electrical circuit includes a conductive stationary contact electrically connected to one of the terminals and a movable contact electrically connected to the other terminal. The movable contact is secured on a movable blade (also referred to as a contact carrier). A handle interfaces with the blade and the trip lever of the trip mechanism as further explained below. The handle can be operated by a user to move the blade, and thus the movable contact, between an open position and a closed position to open or close the electrical circuit. In the closed position, the movable contact is engaged with the stationary contact to allow current flow between the two contacts to a protected load. In the open position, the movable contact is disengaged from the stationary contact to prevent or interrupt current flow to the protected load.

The MCB also includes a trip mechanism. The trip mechanism controls a trip lever, which is connected to the blade via a tension spring (also known as a "toggle spring"). When an abnormal operating condition is detected (e.g., an over current or over temperature fault), the trip mechanism implements a trip operation to disengage the movable contact from the stationary contact by releasing or unlatching the trip lever, which in turn interrupts current flow to the protected load at another open position generally referred to as the tripped position. The handle is also moved to the tripped position. Thereafter, the circuit breaker can be returned to an open position. Once in the open position, the user can move the breaker back to the closed position via the handle. The handle position provides a user with the operational status of the MCB; however, the user must visually inspect the circuit breaker to observe its status. Thus, the user may be unaware of the operational status of a particular circuit breaker, particularly when it is tripped or is not operating properly. Furthermore, there are significant design restrictions when incorporating additional status monitoring components into a circuit breaker. For example, a circuit breaker, such as a MCB, is subject to size constraints.

SUMMARY

To address these and other shortcomings, a circuit breaker is provided with a status indicator which uses an optical-mechanical sensor configuration incorporated with the circuit breaker handle to identify an operational status of the circuit breaker.

In accordance with an embodiment, a circuit breaker can include a light source for emitting light, an optical sensor for detecting light emitted by the light source, a handle and a processor. The handle can be movable between different handle positions which correspond to different circuit breaker statuses. The handle can include a handle body and a light control plate which moves along with the handle body. The light control plate can have different light passage regions each of which is configured to be positioned between the light source and the optical sensor when the handle is moved to a corresponding one of the different handle positions. Each of the different light passage regions allows a different amount of light emitted from the light source to pass to the optical sensor when positioned between the light source and the optical sensor. The processor is configured to determine a status of the circuit breaker based on the sensed amount of light which relates to a position of the handle.

The circuit breaker can have the light control plate extend from the handle body, and can include an interior wall having opposing sides and a guide channel extending through the opposing first and second sides. The light control plate can have a portion extending through the guide channel from the first side of the wall facing the handle body and being movable along the guide channel with movement of the handle. The optical sensor and the light source can be connected on opposite sides of the guide channel on the second side of the wall. The circuit breaker can also include a case for housing circuit breaker components including the interior wall.

At least two of the different light passage regions can each include a slot. The slots of the at least two different light passage regions can have different sizes or shapes to allow passage of different amounts of light. One of the different light passage regions can also include a solid region to prevent light emitted from the light source from passing to the optical sensor.

The different light passage regions can run along an open-end of the light control plate and form a ramp-shape profile, which allows or blocks passage of more or less light from the light source to the optical sensor as the light control plate is moved along the guide channel in one direction.

The different light passage regions can run along an end of the light control plate and form a step-shape profile, which allows or blocks passage of more or less light from the light source to the optical sensor as the light control plate is moved along the guide channel in one direction. Each of the different light passage regions can include a different step of the step-shape profile.

The guide channel and the light control plate can have an arcuate shape. The light source can be an LED transmitter, and the optical sensor can be a photo diode receiver. The light emitted by the light source can be in a visible or infra-red spectrum.

The processor can be further configured to communicate to a remote device, via the communication device, the determined status of the circuit breaker. Furthermore, the light source, the light sensor, the processor and the communication device can be connected on a printed circuit board. The printed circuit board can include an interior wall having opposing sides and a guide channel extending through the opposing first and second sides. The light control plate can have a portion extending through the guide channel from the first side of the wall facing the handle body and being movable along the guide channel with movement of the handle. The optical sensor and the light source can be connected on opposite sides of the guide channel on the second side of the wall.

The status can include one of an open position, a closed position or a tripped position. The status also can include a diagnostic status of the circuit breaker based on the position of the handle.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

A miniature circuit breaker (MCB) of the type discussed herein may generally have a dielectric cover and base with interior compartments or recesses containing, for example, a conductive stationary contact, a conductive blade (also referred to as a contact carrier) with a conductive movable contact, an arcing chamber, and a handle assembly. The MCB also can include a trip mechanism, such as a trip lever, a tension spring and a trip lever actuator assembly (e.g., yoke, armature and bimetal). The handle of the MCB can be connected to the blade to give the operator the ability to turn the circuit breaker ON (in the closed position) to energize a protected circuit or OFF (in the open position) to disconnect the protected circuit, or to reset the circuit breaker from a TRIPPED position after it trips to protect the circuit. A conductive line-side terminal and load-side terminal will extend through the cover for connecting the circuit breaker to the intended electrical conductors. An optical-mechanical status monitoring system for a circuit breaker, particularly a miniature circuit breaker, will be described below with reference to the figures, in accordance with the present disclosure.

Figure 1:
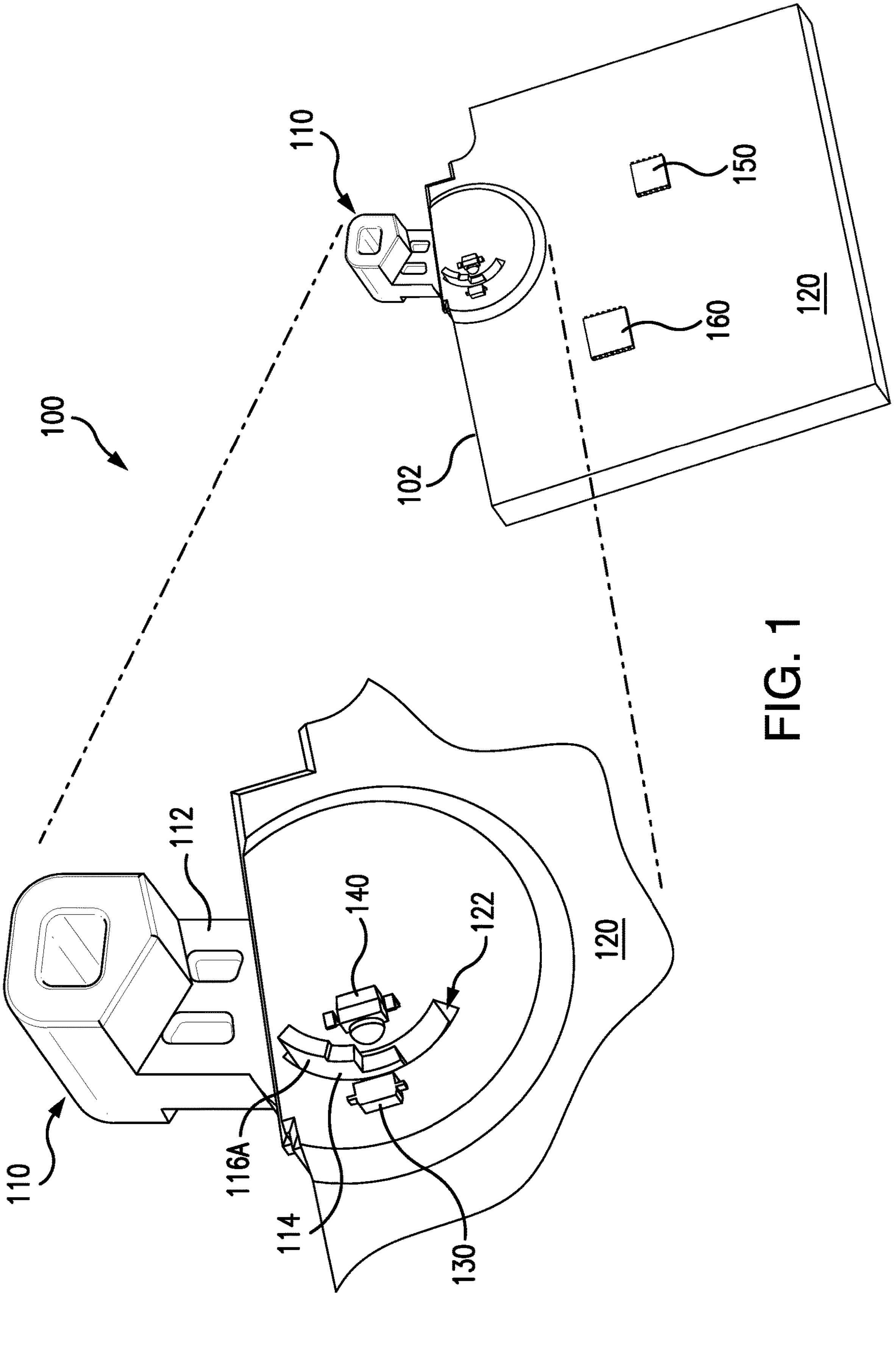
FIG. 1 illustrates a side view of a circuit breaker with one side of a cover removed to show exemplary components including components of an optical-mechanical (or opto-mechanical) status monitoring system of the circuit breaker, in accordance with an embodiment.

FIG. 1 shows a side view of a miniature circuit breaker 100 with one side of its cover removed to show some of the components thereof. The circuit breaker 100 includes a cover and base (together referred to as cover 102) having compartments and recesses for retaining components of the breaker. The components of the circuit breaker 100 include a movable handle 110, and can include other conventional circuit breaker components (not shown), such as a first terminal electrically connected to a stationary contact, and a second terminal electrically connected to a blade with a movable contact. The first terminal can be a line terminal connected to a power line, and the second terminal can be a load terminal connected to a protected load on a branch circuit. The handle 110 can be connected to the blade. In some embodiments, the handle 110 can be pivotally connected via mechanical fasteners to the blade, but may be movably connected through other types of connections (e.g., a wedge connection such as a tab and slot, a tab and notch, etc.). The handle 110 can be operated by a user between an open position (e.g., OFF position) and a closed position (e.g., ON position), or automatically operated to a TRIPPED position when the circuit breaker is tripped due to an abnormal condition. In the ON position, the movable contact can be engaged to the stationary contact to allow the flow of current from the power line connected to the first terminal to the protected load. In the OFF and TRIPPED positions, the movable contact would be disengaged from the stationary contact to prevent the flow of current to the protected load connected to the second terminal.

As further shown in FIG. 1, the circuit breaker 100 also includes an optical-mechanical status monitoring system, which employs a light source(s) 130 to emit light and optical sensor(s) 140 to sense or detect an amount of light (e.g., a light intensity) received from the light source(s) 130. In one embodiment, the light source 130 and optical sensor 140 are connected on one side of a wall 120, such as an interior wall (or portion thereof), of the circuit breaker 100. The wall 120 includes a guide channel 122 (e.g., channel, slot, opening, etc.), which extends from one side of the wall portion to the other side of the wall portion, with the light source 130 and optical sensor 140 arranged across from each other on opposite sides of the guide channel 122. The handle 110 includes a handle body 112 and a light control plate 114 for controlling passage of light from the light source 130 to the optical sensor 140 at different positions of the handle 110 (or "handle positions").

In this example, the light control plate 114 is connected to the handle body 112, and extends from the handle body 112. The light control plate 114 has a portion that extends through the guide channel 122 of the wall 120 (from the handle body 112), and can move with the handle 110 along the guide channel 122. The light control plate 114 has a light control profile, which is defined by a shape, size and/or dimension of at least a portion of the plate 114, such as for example an open-end portion of the plate 114. The light control plate 114 and the guide channel 122 can have an arcuate shape so that the light control plate 114 can rotatably pivot along the guide channel 122 with the movement of the handle 110. In the first embodiment, the light control plate 114 can have a light control profile 116A, e.g., a "slot" type profile, which includes a plurality of light passage regions that allow a passage of different amounts of light (e.g., light intensity) from the light source 130 to be received by the optical sensor 140 at different handle positions. For example, the light control plate 114 can be moved along with the handle 110 so that a different light passage region of the light control plate 114 is positioned between the light source 130 and the optical sensor 140 for each different handle position. Accordingly, it is possible to detect a position of the handle 110 according to the amount of light from the light source 130, which is received across the light control plate 114 (or light passage region thereof) by the optical sensor 140.

The processor 150 can be a microcontroller(s), microprocessor(s) or other control circuitry such as an application-specific integrated circuit (ASIC) or field-programmable gate array (FPGA), and may include a memory to store data and computer executable programs or codes, which when executed, may control among other things the components and operations of the status monitoring system of the circuit breaker 100. The processor 150 may be the processor in the tripping unit for a circuit breaker that performs the detection of abnormal condition, facilitates tripping of the circuit breaker and stores event data (e.g., trip event) in a memory. In various embodiments, the processor 150 may be configured to determine a status of the circuit breaker 100 based on at least the amount of light from the light source 130, which is allowed to pass to the optical sensor 140 across the light control plate 114 (or light passage region thereof). The status may include a handle status (e.g., ON, OFF or TRIPPED position) or a diagnostic status of the circuit breaker 100, as further discussed below. The processor 150 may diagnose, i.e. determine the diagnostic status of, the circuit breaker 100 based on the determined handle position and/or other relevant circuit breaker information (e.g., a trip event) such as stored in memory or a combination thereof.

The communication device 160 can be a transceiver (e.g., a transmitter and receiver), which transmits and receives signals using wire-line or wireless communications. For example, as discussed herein, the communication device 160 is used to communicate status information concerning the circuit breaker 100 to another device or system. The status information signal can be transmitted as a unidirectional, bi-directional or broadcasted signal, via wire-line or wireless communications. The communication device 160 can also be used to receive transmissions, such as remote commands. The remote commands may include a request, such as from a user or a third party, to implement a status monitoring operation for a selected circuit breaker(s) or all circuit breakers, such as in a load center(s).

The light source 130, optical sensor 140, processor(s) 150 and communication device 160 can be provided on the wall 120, which can be a printed circuit board that is incorporated into the circuit breaker 100 such as along a middle-base (or mid-base) section of the breaker. The light source 130 can, for example, produce light in the visible spectrum or infrared spectrum or other light spectrums, which are detectable by the optical sensor 140. In various embodiments, the light source 130 can be an LED transmitter, and the optical sensor 140 can be a photo diode receiver.

Figure 2B:
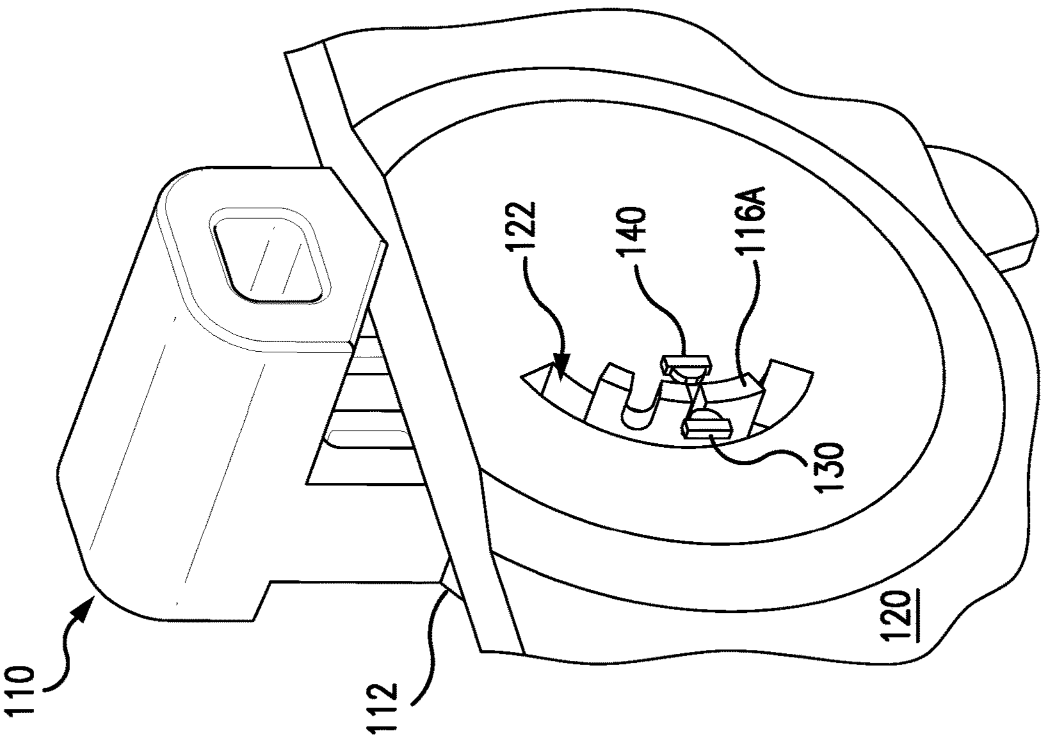
FIGS. 2A and 2B illustrates an example of a status monitoring system of a circuit breaker of FIG. 1, including a light control plate with a slot-type light control profile, in accordance with a first embodiment.
Figure 2A:
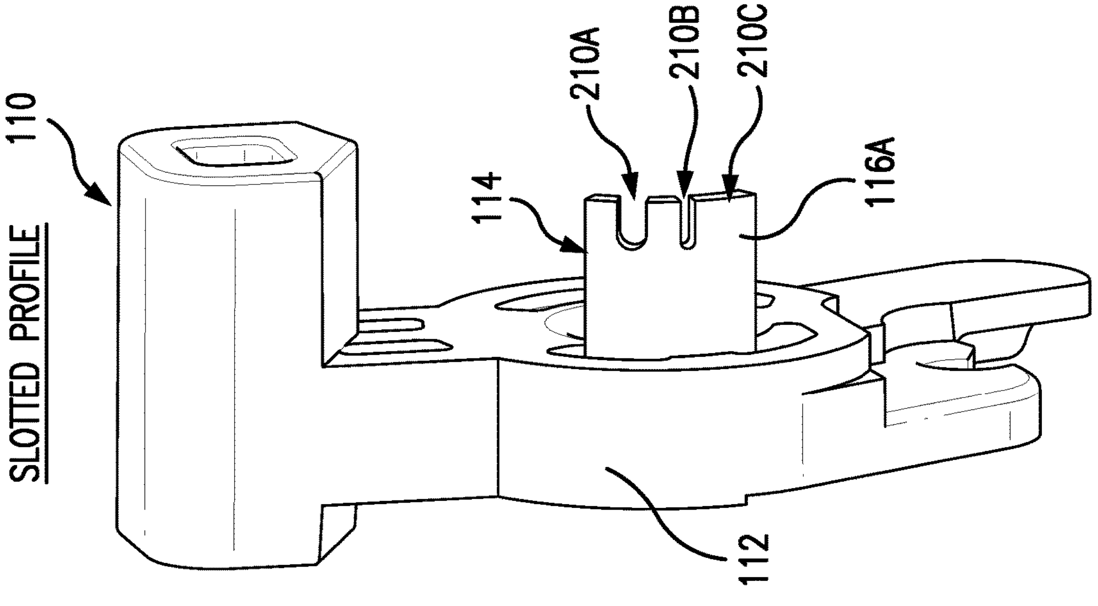

As shown in FIGS. 2A and 2B, in the first embodiment, the light control plate 114 of the handle 110 can have a light control profile 116A, which includes a plurality of light passage regions along an open-ended portion of the light control plate 114. For example, the light control profile 116A can include at least three light passage regions 210A (Region 1), 210B (Region 2) and 210C (Region 3) along an open-end portion of the light control plate 114. Each of the light passage regions 210A, 210B, and 210C can be positioned between the light source 130 and the optic sensor 140 at a different handle position of the handle 110, e.g., OFF position, TRIPPED position, and ON position, respectively. The light passage region 210A includes a large slot for allowing a large amount of light to pass therethrough, the light passage region 210B includes a smaller slot to allow a smaller amount of light to pass therethrough, and the light passage region 210C includes no slot or is solid to prevent light or substantially all of the light to pass therethrough. Depending on the amount of light detected, it is possible to determine the handle position, and thus, also a status of the circuit breaker 100.

Figure 3B:
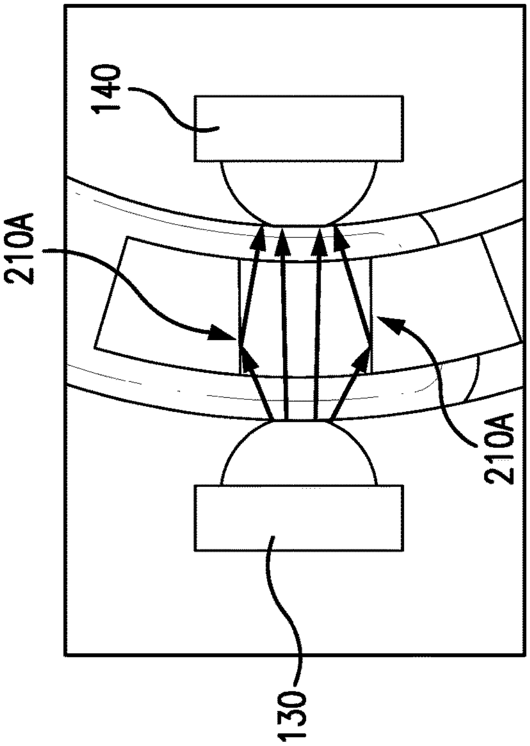
FIGS. 3A and 3B illustrate partial side views, respectively, of the circuit breaker of FIG. 1 in an OFF position.
Figure 3A:
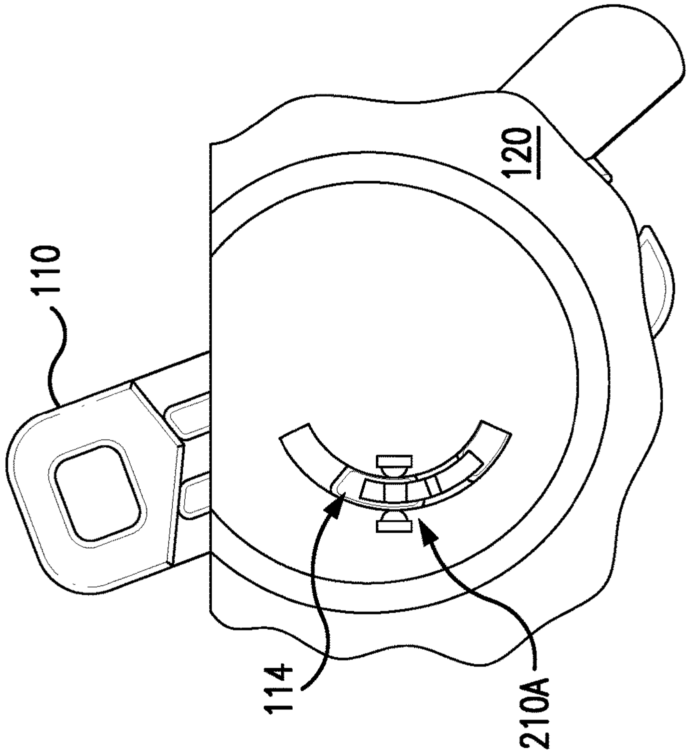
Figure 4B:
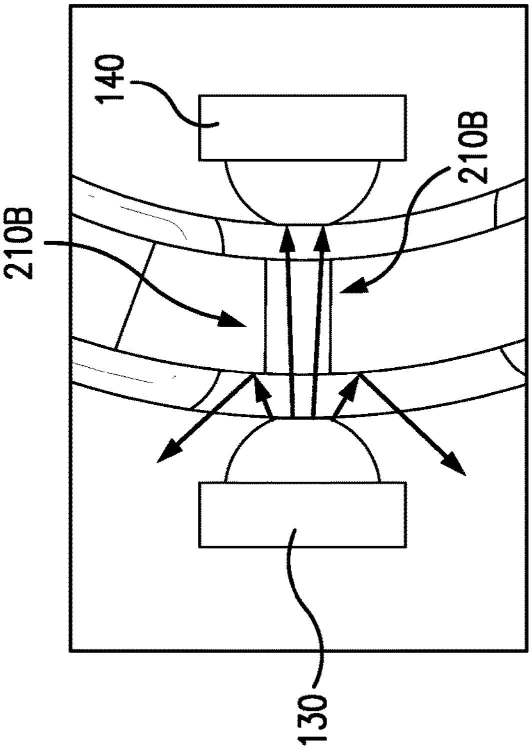
FIGS. 4A and 4B illustrate partial side views, respectively, of the circuit breaker of FIG. 1 in a TRIPPED position.
Figure 4A:
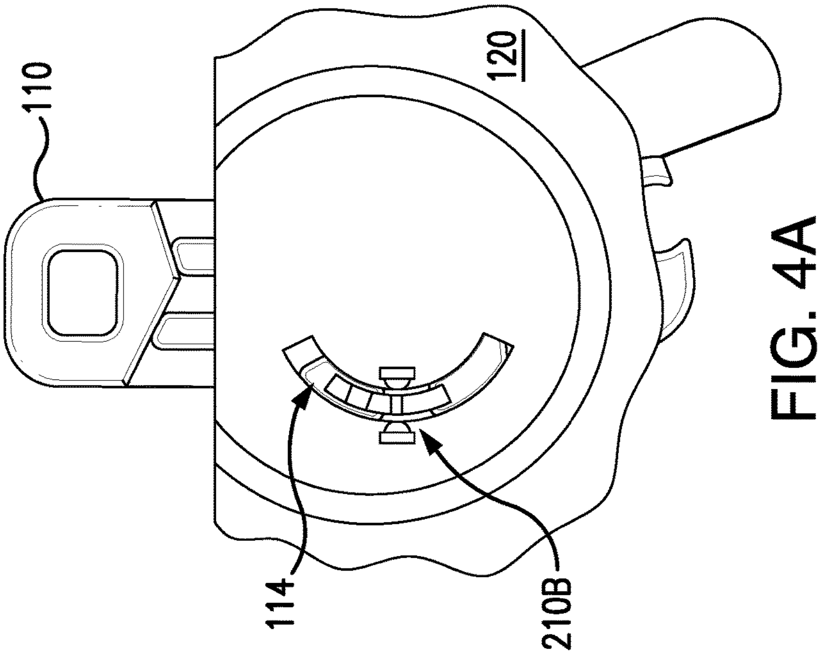
Figure 5A:
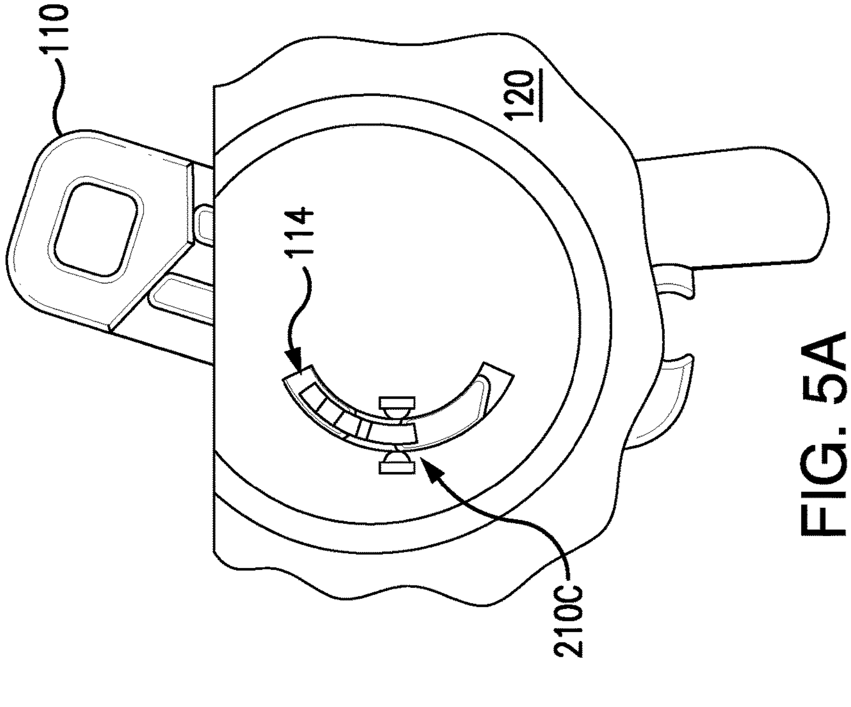
FIGS. 5A and 5B illustrate partial side views, respectively, of the circuit breaker of FIG. 1 in an ON position.
Figure 5B:
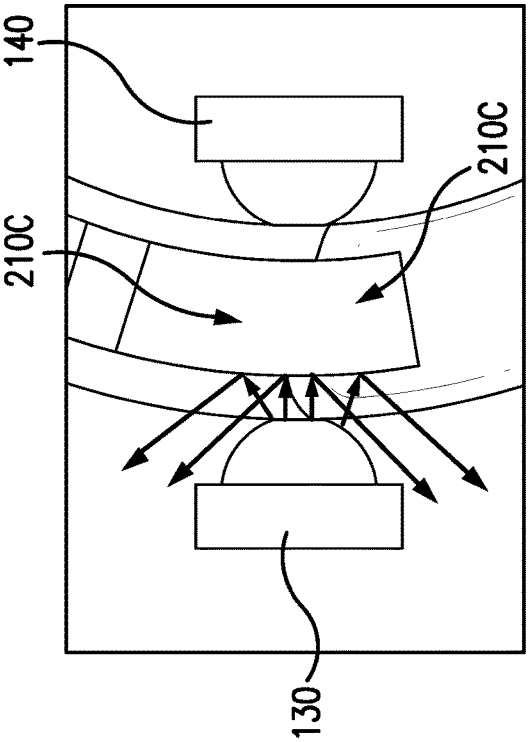

FIGS. 3A and 3B illustrate partial side views, respectively, of the circuit breaker 100 of FIGS. 1, 2A and 2B in the OFF position. As shown in FIG. 3B, the amount of light from the light source 130 passing through the light passage region 210A of the light control plate 114 and received by the optical sensor 140 is large amount of light (e.g., higher intensity) within a first predefined light range. FIGS. 4A and 4B illustrate partial side views, respectively, of the circuit breaker 100 of FIGS. 1, 2A and 2B in a TRIPPED position. As shown in FIG. 4B, the amount of light from the light source 130 passing through the light passage region 210B of the light control plate 114 and received by the optical sensor 140 is medium amount of light (e.g., medium or middle intensity) within a second predefined light range. FIGS. 5A and 5B illustrate partial side views, respectively, of the circuit breaker 100 of FIGS. 1, 2A and 2B in an ON position. As shown in FIG. 5B, the amount of light from the light source 130 passing through the light passage region 210B of the light control plate 114 and received by the optical sensor 140 is none or substantially no amount of light (e.g., low or no light intensity) within a third predefined light range.

As shown in these figures, the amount of light (e.g., light intensity) sensed by the optical sensor 140 varies according to a location of the light control plate 114 and its light passage regions 210A, 210B and 210C relative to the location of the light source 130 and the optical sensor 140. For example, the light passage region of the light control plate 114 positioned between the light source 130 and the optical sensor 140 controls the passage of the amount of light therebetween, which is different at each of the different handle positions, e.g., OFF position (FIGS. 3A and 3B), TRIPPED position (FIGS. 4A and 4B) and ON position (FIGS. 5A and 5B).

Figure 6B:
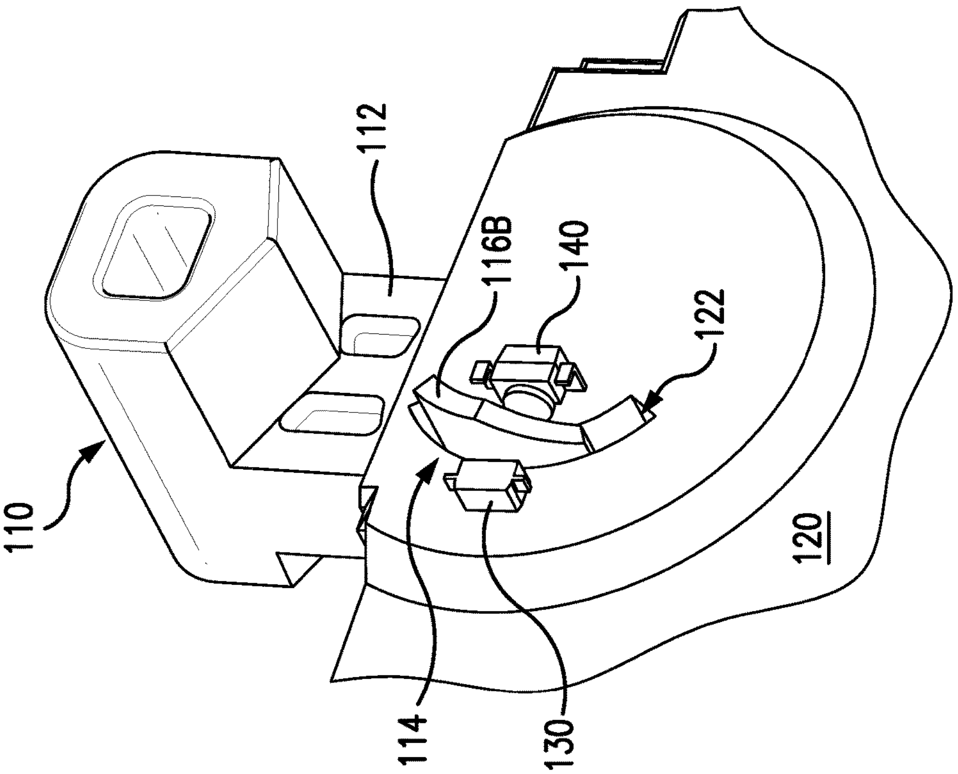
FIGS. 6A and 6B illustrates an example of a status monitoring system of a circuit breaker of FIG. 1, including the light control plate with a ramp-type light control profile, in accordance with a second embodiment.
Figure 6A:
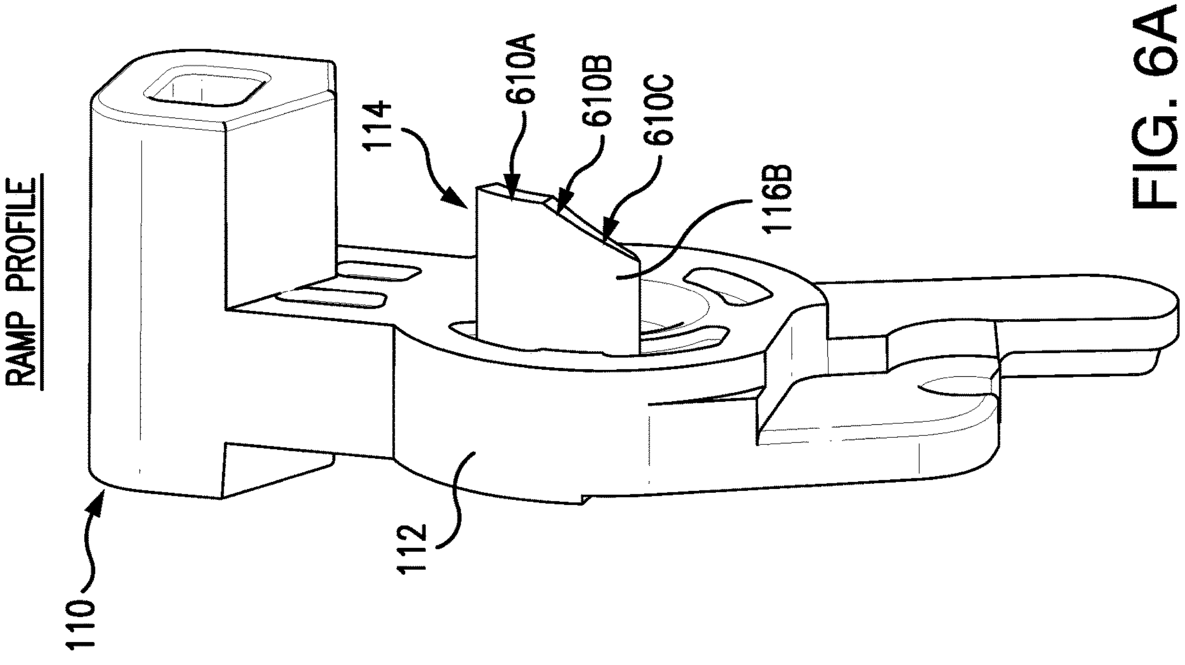

FIGS. 6A and 6B show a light control profile of the light control plate 114, such as a "ramp" type profile, in accordance with a second embodiment. In this embodiment, the light control plate 114 of the handle 110 can have a light control profile 116B, which includes a plurality of light passage regions along an open-ended portion of the light control plate 114. For example, the light control profile 116B can include at least three light passage regions 610A (Region 1), 610B (Region 2) and 610C (Region 3) along an open-end portion of the light control plate 114. Each of the light passage regions 610A, 610B, and 610C can be positioned between the light source 130 and the optic sensor 140 at a different handle position of the handle 110, e.g., OFF position, TRIPPED position, and ON position, respectively. The light passage region 610A can include a portion of a first ramp shape with a higher or more vertically inclined slope for allowing a little or small amount of light to pass therethrough; the light passage region 610B can include a transition region, between the first ramp shape and a second ramp shape with a lower or less vertically inclined slope, for allowing a middle or medium amount of light to pass therethrough; and the light passage region 610C can include a bottom of the second slope shape for allowing a large or larger amount of light to pass therethrough. Depending on the amount of light detected, it is possible to determine the handle position, and thus, also a status of the circuit breaker 100. In this example, the light control profile 116B employs two different ramp shapes, but the light control profile can employ any number, size and/or dimension of ramp shapes, such as three different ramp shapes with different slopes for each light passage region 610A, 610B and 610C, so long as they allow the passage of different amounts of light which are distinguishable or identifiable from the light sensed by the optical sensor 140.

Figure 7B:
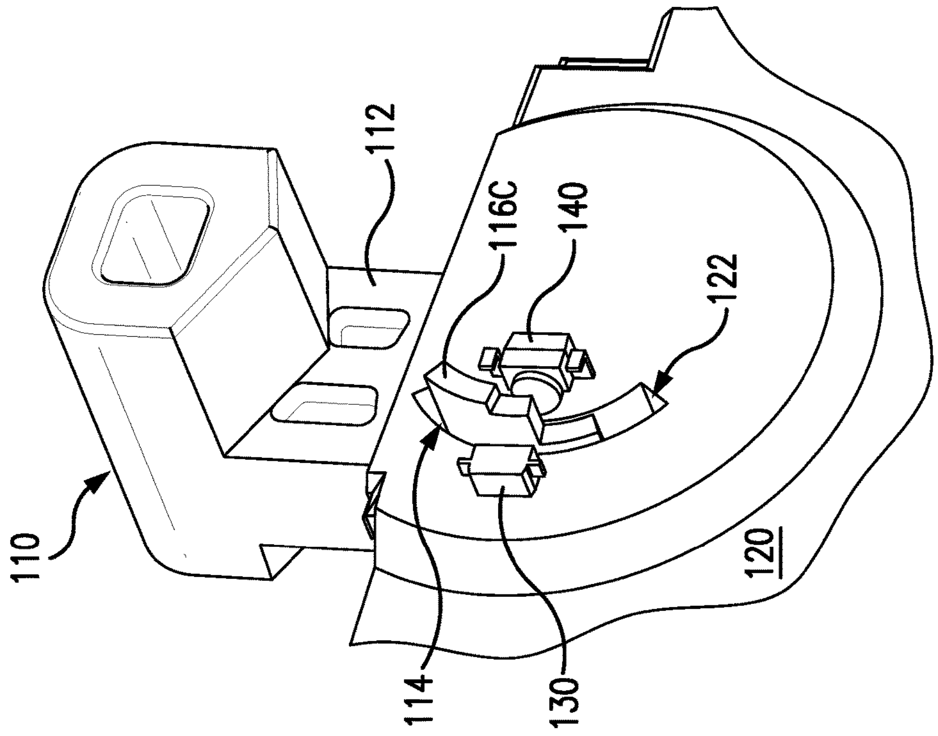
FIGS. 7A and 7B illustrates an example of a status monitoring system of a circuit breaker of FIG. 1, including the light control plate with a step-type light control profile, in accordance with a third embodiment.
Figure 7A:
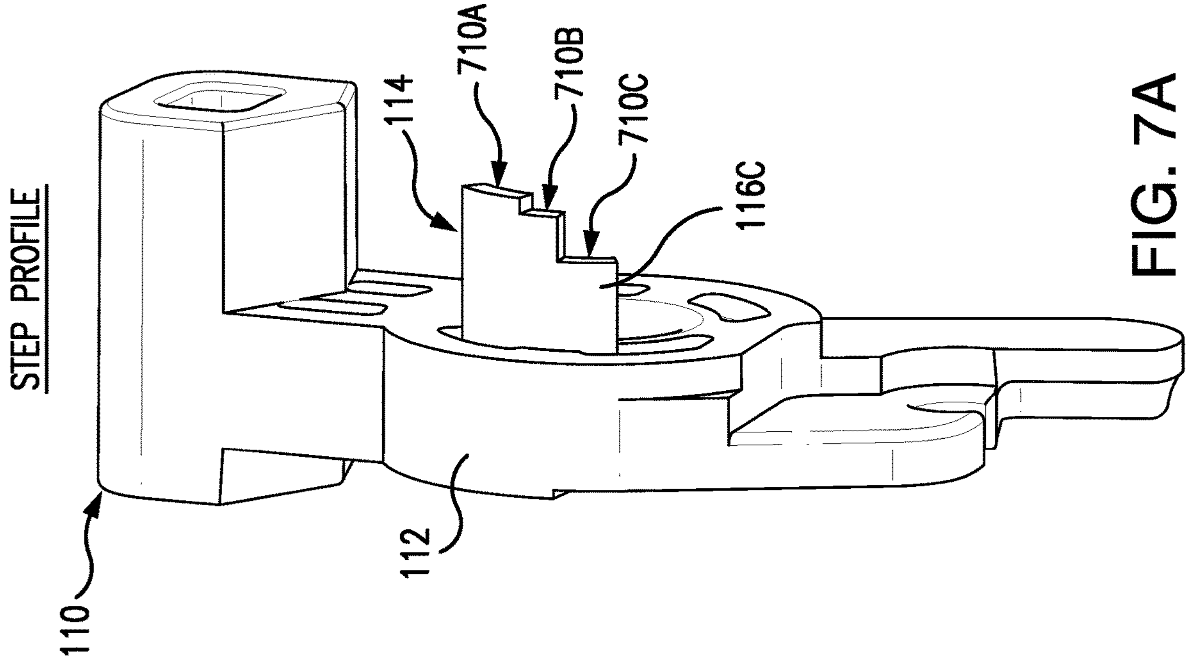

FIGS. 7A and 7B show a light control profile of the light control plate 114, such as a "step" type profile, in accordance with a third embodiment. In this embodiment, the light control plate 114 of the handle 110 can have a light control profile 116C, which includes a plurality of light passage regions along an open-ended portion of the light control plate 114. For example, the light control profile 116C can include at least three light passage regions 710A (Region 1), 710B (Region 2) and 710C (Region 3) along an open-end portion of the light control plate 114. Each of the light passage regions 710A, 710B, and 710C can be positioned between the light source 130 and the optic sensor 140 at a different handle position, e.g., OFF position, TRIPPED position, and ON position, respectively. The light passage region 710A can include a first step (or step-shape) for allowing a little or small amount of light to pass therethrough; the light passage region 710B can include a second step for allowing a medium or middle amount of light to pass therethrough; and the light passage region 710C can include a third step for allowing a large or larger amount of light to pass therethrough. Depending on the amount of light detected, it is possible to determine the handle position, and thus, also a status of the circuit breaker 100. In this example, the light control profile 116C employs three different steps (or step shapes), but can employ any number, size and shape/dimension of steps for each light passage region 710A, 710B and 710C, so long as they allow the passage of different amounts of light which are distinguishable or identifiable from the light sensed by the optical sensor 140.

Figure 8:
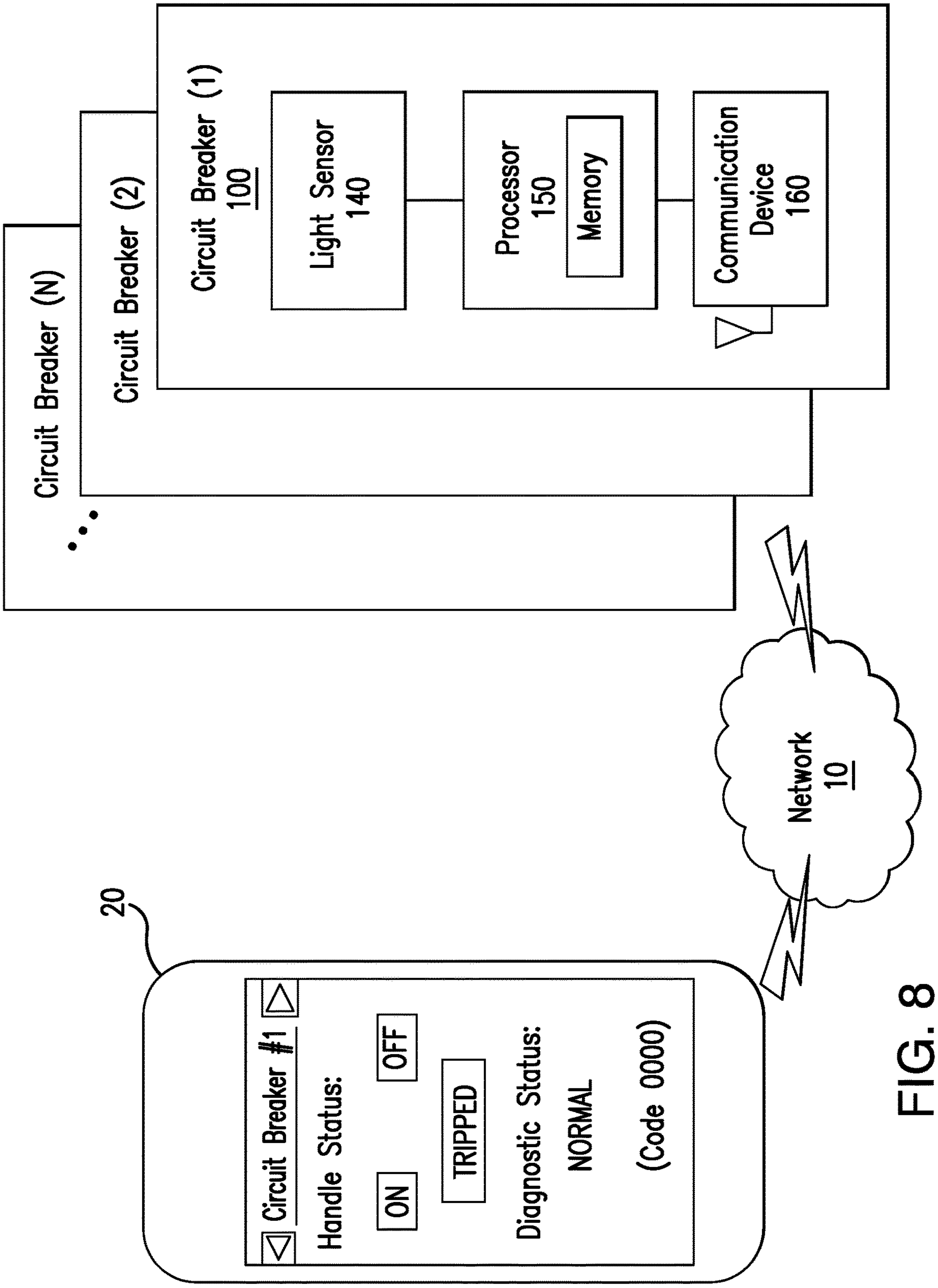
FIG. 8 illustrates an overall system view of a plurality of circuit breakers, such as in FIG. 1, in communication with a remote device across a network, in accordance with an embodiment.

FIG. 8 illustrates an overall system view of a plurality of circuit breakers, such as a plurality of circuit breakers 100 as shown in the figures, in communication with a remote device 20 across a network 10. The remote device 20 may be a computerized system with communication capability, such as a smartphone (shown) or a computer (e.g., mobile computer, tablet, server, etc.). The circuit breakers 100 may be located in one or more load centers. As shown, each circuit breaker 100 may communicate status information to the remote device 20, via the network 10. The status information may include a handle position status of the circuit breaker 100, e.g., ON, OFF or TRIPPED position, based on the determined position of the handle. The status information may also include diagnostic status information, to reflect whether the circuit breaker is operating within specified parameters. The circuit breaker 100 can determine diagnostic status (e.g., NORMAL or ABNORMAL, etc.) based on the monitored position of the circuit breaker handle. A circuit breaker may be in an abnormal state when the determined position from the sensed light amount (or light intensity) is not within normal operating parameters (e.g., a predetermined range for a handle position). For example, the circuit breaker 100 may be in the abnormal state if the sensed handle position is outside of an acceptable location of known handle positions (e.g., outside the light passage regions (Regions 1-3), between Region 1 and Region 2, between Region 2 and Region 3, etc.). The abnormal state may reflect damaged or inefficient operation of electrical or mechanical components of the circuit breaker 100.

Figure 9:
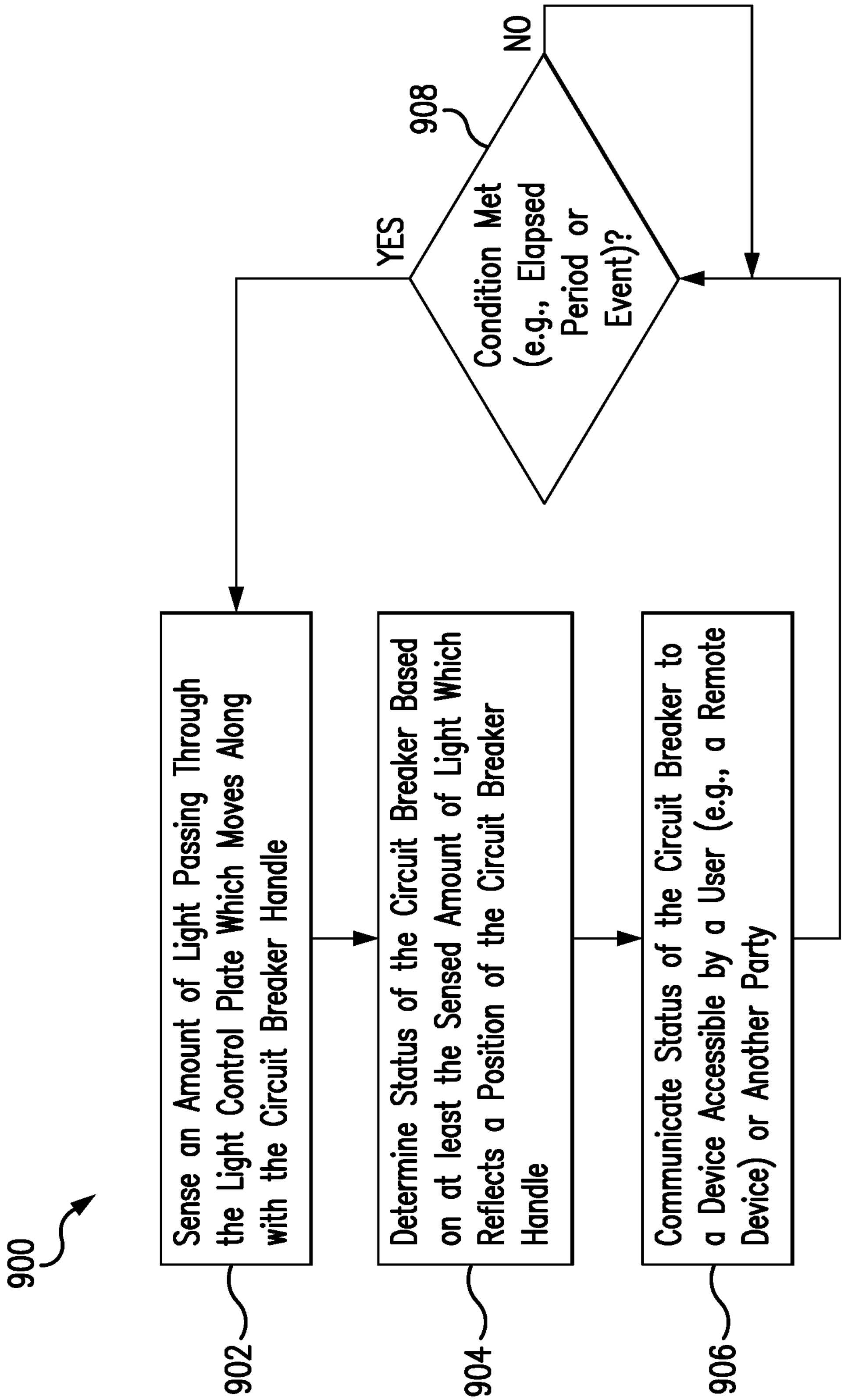
FIG. 9 illustrates an example method by which a circuit breaker, such as in FIG. 1, monitors a status of the circuit breaker, such as the handle position, in accordance with an embodiment.

FIG. 9 illustrates an exemplary method 900 by which a circuit breaker, such as the circuit breaker 100 in the figures, monitors a status of the circuit breaker, such as the handle position, in accordance with an embodiment.

At block 902, the optical sensor 140 senses an amount of light passing through the light control plate 114 (or light passage region thereof), which moves along with the handle 110, and provides a signal(s) corresponding to the sensed light or amount of light (e.g., light intensity). The signal(s) may be processed by signal conditioning circuitry (e.g., amplifier(s), filter(s), etc.).

At block 904, the processor 150 receives a signal(s) corresponding to the sensed light or amount of light, and determines a status of the circuit breaker based on the sensed light, which reflects a position of the circuit breaker handle. For example, the handle position status may include ON, OFF or TRIPPED position or other handle positions available on the circuit breaker.

At block 906, the communication device 160 communicates the status of the circuit breaker to a device accessible by a user (e.g., a remote device 20 such as in FIG. 8) or another party (e.g., a monitoring system or service, the product manufacturer, etc.). The operations in blocks 902 through 906 may be repeated in response to a condition, e.g., after an elapsed period or an occurrence of an event, at block 908. For example, the circuit breaker 100 may implement the method 900 under control of the processor 150 periodically at predetermined time intervals, randomly, or upon a user command (e.g., a local command or remote command received by the communication device 160). Furthermore, the status and associated data (including raw measurement data) may be stored in a memory that is maintained locally at the circuit breaker or remotely for subsequent access and evaluation.

Figure 10:
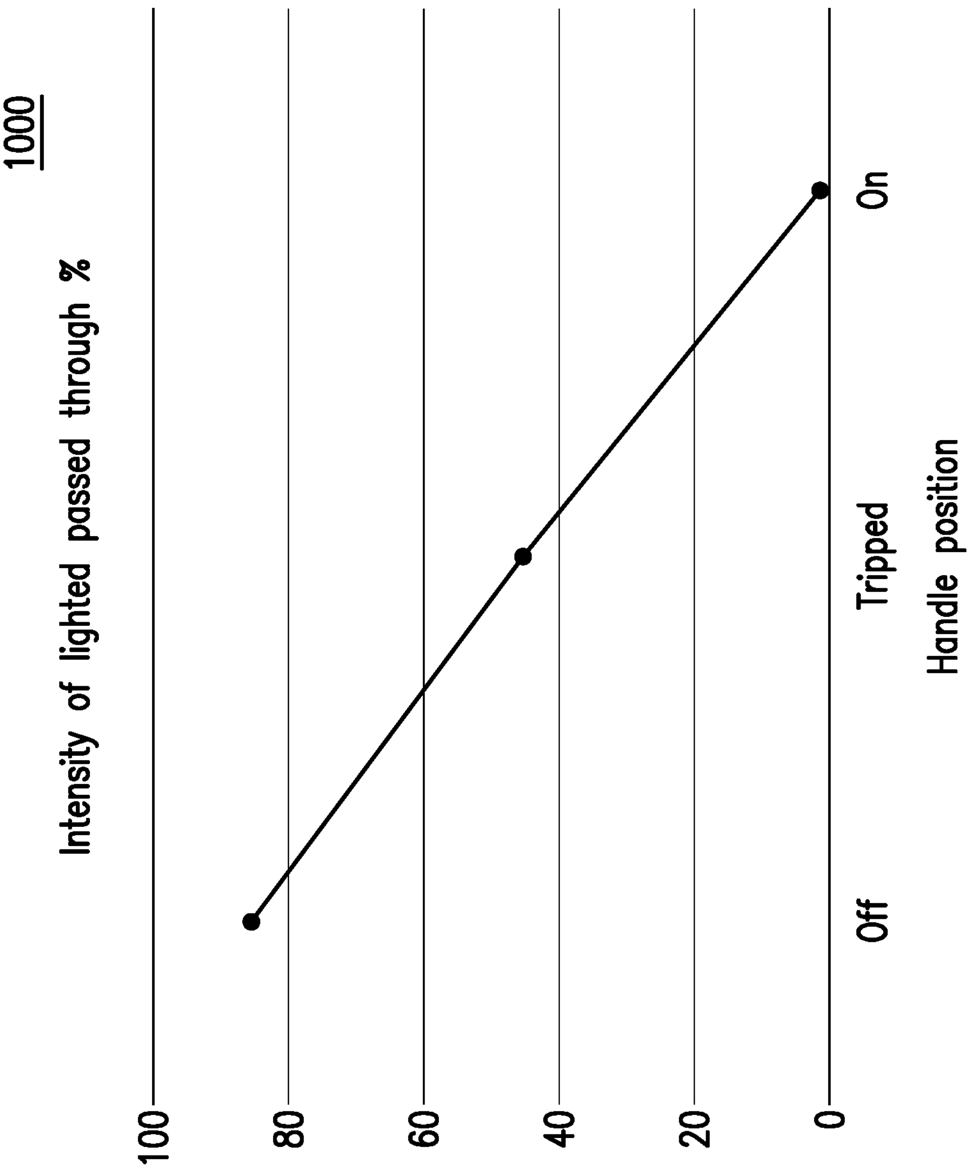
FIG. 10 illustrates an exemplary graph of light intensity versus handle position, in accordance with an embodiment.

FIG. 10 illustrates an exemplary graph 1000 of light intensity (in percentage) versus handle position, in accordance with an embodiment. In this example, the circuit breaker can have three handle positions, e.g., OFF, TRIPPED and ON, which are detectable using the opto-mechanical status monitoring system with the light control plate, described herein. In the OFF position, the light control plate (or light passage region associated with the OFF position) allows a high or higher light intensity to pass from a light source to an optical sensor (e.g., range between 80 to 90 percent). In the TRIPPED position, the light control plate (or light passage region associated with the TRIPPED position) allows a middle or medium light intensity to pass from a light source to an optical sensor (e.g., range between 40 to 50 percent). In the ON position, the light control plate (or light passage region associated with the ON position) allows a high or higher light intensity to pass from a light source to an optical sensor (e.g., range between 0 to 10 percent). In this example, the light control profile of the light control plate can have different light passage regions which allow or block passage of more or less light from the light source to the optical sensor as the light control plate is moved along the guide channel (e.g., from one end of the guide channel toward the other end of the guide channel). The graph in FIG. 10 provides a non-limiting example of light intensity range provided by a light control profile of a light control plate.

It should be understood that the size, shape and/or dimension of the light control plate (or light passage regions thereof) can be varied to associate a range of light or light intensity to any number of different handle positions to allow discrimination thereof. The light control plate can be formed as a unitary or single component/piece along with the handle body from a dielectric material or non-electrical conducting material, or alternatively formed of separate pieces or components. The light control plate and guide channel can have an arcuate or other shape according to a motion of the light control plate relative to the light source(s) and optical sensor(s) and the handle body. The light control plate and its light passage regions can be formed as a unitary or single component/piece, or formed from a combination of different components/pieces.

Furthermore, the status monitoring system can instead employ a micro-switch(es) instead of optical-mechanical components described herein to sense the handle positions. The light control plate, which moves along with the handle, can actuate the micro-switch or micro-switches. The switching signals from the micro-switch(es) can be used to identify the handle positions, and thus, the status of a circuit breaker.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of monitoring a status of a circuit breaker having a handle movable between different positions which correspond to different circuit breaker statuses, the handle including a handle body and a light control plate, the method comprising:

sensing, via an optical sensor, an amount of light from a light source passing through the light control plate which is movable with a handle of the circuit breaker, the light control plate having different light passage regions each of which is configured to be positioned between the light source and the optical sensor when the handle is moved to a corresponding one of the different handle positions, each of the different light passage regions being configured to allow a different amount of light emitted from the light source to pass to the optical sensor when positioned between the light source and the optical sensor; and determining a status of the circuit breaker based on the sensed amount of light which relates to a position of the handle, wherein the light control plate extends from the handle body, the circuit breaker further comprising:

an interior wall having first and second opposing sides and a guide channel extending through the opposing first and second sides, the light control plate having a portion extending through the guide channel from the first side of the wall facing the handle body and being movable along the guide channel with movement of the handle, the optical sensor and the light source being connected on opposite sides of the guide channel on the second side of the wall.

2. The method of claim 1, wherein at least two of the different light passage regions each include a slot, the slots of the at least two different light passage regions having different sizes or shapes to allow passage of different amounts of light.

3. The method of claim 1, wherein one of the different light passage regions comprises a solid region to prevent light emitted from the light source from passing to the optical sensor.

4. The method of claim 1, wherein the different light passage regions run along an open-end of the light control plate and form a ramp-shape profile, which allows or blocks passage of more or less light from the light source to the optical sensor as the light control plate is moved along a guide channel in one direction.

5. The method of claim 1, wherein the different light passage regions run along an end of the light control plate and form a step-shape profile, which allows or blocks passage of more or less light from the light source to the optical sensor as the light control plate is moved along a guide channel in one direction.

6. The method of claim 5, wherein each of the different light passage regions comprises a different step of the step-shape profile.

7. The method of claim 1, wherein the guide channel and the light control plate have an arcuate shape.

8. The method of claim 1, further comprising:

transmitting the determined status to a remote device.

9. The method of claim 1, wherein the status comprises one of an open position, a closed position or a tripped position, or wherein the status comprises a diagnostic status of the circuit breaker based on the position of the handle.

10. A non-transitory computer medium storing computer executable code, which when executed by one or more processors, is configured to implement a method of monitoring a status of a circuit breaker having a handle movable between different positions which correspond to different circuit breaker statuses, the handle including a handle body and a light control plate, the method comprising:

sensing, via an optical sensor, an amount of light from a light source passing through the light control plate which is movable with a handle of the circuit breaker, the light control plate having different light passage regions each of which is configured to be positioned between the light source and the optical sensor when the handle is moved to a corresponding one of the different handle positions, each of the different light passage regions being configured to allow a different amount of light emitted from the light source to pass to the optical sensor when positioned between the light source and the optical sensor; and determining a status of the circuit breaker based on the sensed amount of light which relates to a position of the handle, wherein the light control plate extends from the handle body, the circuit breaker further comprising:

an interior wall having first and second opposing sides and a guide channel extending through the opposing first and second sides, the light control plate having a portion extending through the guide channel from the first side of the wall facing the handle body and being movable along the guide channel with movement of the handle, the optical sensor and the light source being connected on opposite sides of the guide channel on the second side of the wall.

11. The non-transitory computer medium of claim 10, wherein at least two of the different light passage regions each include a slot, the slots of the at least two different light passage regions having different sizes or shapes to allow passage of different amounts of light.

12. The non-transitory computer medium of claim 10, wherein one of the different light passage regions comprises a solid region to prevent light emitted from the light source from passing to the optical sensor.

13. A non-transitory computer medium storing computer executable code, which when executed by one or more processors, is configured to implement a method of monitoring a status of a circuit breaker having a handle movable between different positions which correspond to different circuit breaker statuses, the handle including a handle body and a light control plate, the method comprising:

sensing, via an optical sensor, an amount of light from a light source passing through the light control plate which is movable with a handle of the circuit breaker, the light control plate having different light passage regions each of which is configured to be positioned between the light source and the optical sensor when the handle is moved to a corresponding one of the different handle positions, each of the different light passage regions being configured to allow a different amount of light emitted from the light source to pass to the optical sensor when positioned between the light source and the optical sensor; and determining a status of the circuit breaker based on the sensed amount of light which relates to a position of the handle, wherein the different light passage regions run along an open-end of the light control plate and form a ramp-shape profile, which allows or blocks passage of more or less light from the light source to the optical sensor as the light control plate is moved along a guide channel in one direction.

14. A non-transitory computer medium storing computer executable code, which when executed by one or more processors, is configured to implement a method of monitoring a status of a circuit breaker having a handle movable between different positions which correspond to different circuit breaker statuses, the handle including a handle body and a light control plate, the method comprising:

sensing, via an optical sensor, an amount of light from a light source passing through the light control plate which is movable with a handle of the circuit breaker, the light control plate having different light passage regions each of which is configured to be positioned between the light source and the optical sensor when the handle is moved to a corresponding one of the different handle positions, each of the different light passage regions being configured to allow a different amount of light emitted from the light source to pass to the optical sensor when positioned between the light source and the optical sensor; and determining a status of the circuit breaker based on the sensed amount of light which relates to a position of the handle, wherein the different light passage regions run along an end of the light control plate and form a step-shape profile, which allows or blocks passage of more or less light from the light source to the optical sensor as the light control plate is moved along a guide channel in one direction.

15. The non-transitory computer medium of claim 14, wherein each of the different light passage regions comprises a different step of the step-shape profile.

16. The non-transitory computer medium of claim 10, wherein the guide channel and the light control plate have an arcuate shape.

17. The non-transitory computer medium of claim 10, wherein the method further comprises:

transmitting the determined status to a remote device.

18. The non-transitory computer medium of claim 10, wherein the status comprises one of an open position, a closed position or a tripped position, or wherein the status comprises a diagnostic status of the circuit breaker based on the position of the handle.

* * * * *